(12) United States Patent
Sato (10) Patent No.: US 9,735,591 B2
(45) Date of Patent: Aug. 15, 2017

(54) CONTROL APPARATUS, CONTROL SYSTEM, AND STORAGE BATTERY CONTROL METHOD

(71) Applicant: KYOCERA CORPORATION, Kyoto (JP)

(72) Inventor: Hirotaka Sato, Yokohama (JP)

(73) Assignee: KYOCERA Corporation, Kyoto (JP)

(*) Notice: Subject to any disclaimer, the term of this patent is extended or adjusted under 35 U.S.C. 154(b) by 324 days.

(21) Appl. No.: 14/380,963

(22) PCT Filed: Feb. 27, 2013

(86) PCT No.: PCT/JP2013/055195
§ 371 (c)(1),
(2) Date: Aug. 26, 2014

(87) PCT Pub. No.: WO2013/129499
PCT Pub. Date: Sep. 6, 2013

(65) Prior Publication Data
US 2015/0171641 A1    Jun. 18, 2015

(30) Foreign Application Priority Data
Feb. 27, 2012 (JP) .................. 2012-040684

(51) Int. Cl.
*H02J 7/00* (2006.01)
*H01M 10/42* (2006.01)
(Continued)

(52) U.S. Cl.
CPC .......... *H02J 7/0021* (2013.01); *H02J 7/0004* (2013.01); *H02J 7/007* (2013.01); *H02J 7/0008* (2013.01);
(Continued)

(58) Field of Classification Search
CPC ..... H01M 2220/20; H01M 2010/4271; H01M 2010/4278; H02J 2007/0098;
(Continued)

(56) References Cited

U.S. PATENT DOCUMENTS 5,939,861 A * 8/1999 Joko .................. B60K 6/28
290/40 R
6,424,123 B1 * 7/2002 Odaohhara .......... H02J 7/0073
320/134
(Continued)

FOREIGN PATENT DOCUMENTS

EP    2752956 A1    7/2014
JP    H08-138749 A   5/1996
(Continued)

OTHER PUBLICATIONS

International Search Report; PCT/JP2013/055195; Apr. 16, 2013.
(Continued)

*Primary Examiner* — Helen Rossoshek
(74) *Attorney, Agent, or Firm* — Procopio, Cory, Hargreaves & Savitch LLP (57) ABSTRACT

A HEMS 100 that controls a plurality of storage batteries 10 provided in a power consumer acquires information on type and/or deterioration level of each of the plurality of storage batteries. The HEMS 100 controls charge and discharge of each of the plurality of storage batteries 10 on the basis of the information on the type and/or the deterioration level of each of the plurality of storage batteries 10.

12 Claims, 5 Drawing Sheets

(51) Int. Cl.
 *H02J 3/14* (2006.01)
 *H02J 3/32* (2006.01)
(52) U.S. Cl.
 CPC ........ *H02J 7/0013* (2013.01); *H01M 10/4207* (2013.01); *H01M 2010/4271* (2013.01); *H01M 2010/4278* (2013.01); *H02J 3/14* (2013.01); *H02J 3/32* (2013.01); *H02J 7/0063* (2013.01); *H02J 2003/146* (2013.01); *H02J 2007/0067* (2013.01); *H02J 2007/0098* (2013.01); *Y04S 20/224* (2013.01)
(58) Field of Classification Search
 CPC ...... H02J 7/0004; H02J 7/0021; H02J 7/0008; H02J 7/0013; H02J 7/007; H02J 7/0063; H02J 2007/0067; H02J 3/14; Y02T 10/7044; Y04S 20/224
 See application file for complete search history.

(56) References Cited

U.S. PATENT DOCUMENTS

| | | | | |
|---|---|---|---|---|
| 6,563,318 B2* | 5/2003 | Kawakami | ......... | G01R 31/3679 320/132 |
| 6,586,940 B2* | 7/2003 | Asakura | ......... | H02M 3/07 324/426 |
| 6,614,233 B2* | 9/2003 | Sugimoto | ......... | G01R 31/3658 324/434 |
| 6,850,038 B2* | 2/2005 | Arai | ......... | H01M 10/48 320/132 |
| 7,211,987 B2* | 5/2007 | Aoki | ......... | G01R 31/3624 320/134 |
| 7,227,335 B2* | 6/2007 | Sakakibara | ......... | G01R 31/3679 320/132 |
| 7,362,074 B2* | 4/2008 | Iwane | ......... | G01R 31/3662 320/132 |
| 7,385,496 B2* | 6/2008 | Ogino | ......... | G08B 13/19645 340/3.1 |
| 9,048,514 B2* | 6/2015 | Newman | ......... | H01M 10/48 |
| 2008/0224667 A1* | 9/2008 | Tanaka | ......... | H01M 10/48 320/139 |
| 2008/0290835 A1* | 11/2008 | Hayashi | ......... | H01M 2/1022 320/112 |
| 2010/0000809 A1* | 1/2010 | Nishi | ......... | B60K 6/445 180/65.29 |
| 2010/0001693 A1* | 1/2010 | Iida | ......... | G01R 31/3679 320/134 |
| 2010/0030498 A1* | 2/2010 | Kimura | ......... | G01R 31/3679 702/63 |
| 2010/0036626 A1* | 2/2010 | Kang | ......... | G01R 31/3679 702/63 |
| 2010/0274508 A1* | 10/2010 | Koyama | ......... | G01R 31/3679 702/63 |
| 2011/0006741 A1 | 1/2011 | Ando | | |
| 2011/0161025 A1* | 6/2011 | Tomura | ......... | G01R 31/3651 702/63 |
| 2011/0193516 A1* | 8/2011 | Oohara | ......... | H02J 3/32 320/101 |
| 2011/0288691 A1* | 11/2011 | Abe | ......... | F03D 7/00 700/292 |
| 2011/0313613 A1* | 12/2011 | Kawahara | ......... | H01M 10/441 701/34.4 |
| 2012/0007556 A1* | 1/2012 | Matsui | ......... | G01R 31/3651 320/112 |
| 2012/0109443 A1* | 5/2012 | Takahashi | ......... | B60L 1/003 701/22 |
| 2012/0206107 A1* | 8/2012 | Ono | ......... | H02J 7/0029 320/136 |
| 2012/0223670 A1* | 9/2012 | Kinjo | ......... | H02J 3/32 320/103 |
| 2013/0069598 A1* | 3/2013 | Tanaka | ......... | H01M 10/0525 320/134 |
| 2013/0271148 A1* | 10/2013 | Maeda | ......... | B60L 3/0046 324/426 |
| 2014/0042978 A1* | 2/2014 | Nishibayashi | ......... | H02J 7/007 320/134 |

FOREIGN PATENT DOCUMENTS

| | | |
|---|---|---|
| JP | H10-201120 A | 7/1998 |
| JP | 2007-259612 A | 10/2007 |
| JP | 2008-067418 A | 3/2008 |
| JP | 2010-028876 A | 2/2010 |
| JP | 2011-017203 A | 1/2011 |
| JP | 2011-250664 A | 12/2011 |
| JP | 2012-029451 A | 2/2012 |
| JP | 2012029451 A * | 2/2012 |

OTHER PUBLICATIONS

Extended European Search Report dated Nov. 3, 2015 issued by the European Patent Office for Counterpart European Application No. EP 13754672.7.

Office Action dated Oct. 18, 2016 issued by the Japan Patent Office in corresponding Japanese Patent Application No. 2016-028617.

\* cited by examiner

CONTROL APPARATUS, CONTROL SYSTEM, AND STORAGE BATTERY CONTROL METHOD

TECHNICAL FIELD

The present invention relates to a control apparatus that controls a plurality of storage batteries provided in a power consumer, a control system therefore, and a storage battery control method thereof.

BACKGROUND ART

In recent years, there has been an increased interest in energy saving, and an energy management system (EMS) for performing a power management for each power consumer has drawn attention. A control apparatus for performing a power management for each home is called a home energy management system (HEMS).

Further, a storage battery is being introduced to a consumer, where the storage battery is charged with power from a distributed power source or a grid power source and is used for supplying a load apparatus with the discharged power.

Further, there is proposed a technology in which a plurality of storage batteries are dispersively arranged in a home (see Patent Literature 1, for example).

CITATION LIST

Patent Literature

[PTL 1] Japanese Unexamined Patent Application Publication No. 2011-17203

SUMMARY OF INVENTION

A storage battery having a higher performance and a larger capacity is expensive, and thus, it is not necessarily easy to introduce a plurality of such storage batteries to a home.

Therefore, it is assumed that a used on-vehicle storage battery is reused for a home and a large number of storage batteries having a lower performance and a smaller capacity are combined to be used for a home.

However, there is no such a consideration given to the conventionally proposed technology, and thus, it is difficult to effectively control a plurality of storage batteries.

Therefore, an object of the present invention is to provide a control apparatus capable of effectively controlling a plurality of storage batteries provided in a consumer, a control system therefore, and a storage battery control method thereof.

To solve the above-described problems, the present invention includes the following characteristics.

A control apparatus of the present invention is a control apparatus that controls a plurality of storage batteries provided in a power consumer, and is characterized by comprising: an acquisition unit that acquires information on type and/or deterioration level of each of the plurality of storage batteries; and a charge and discharge control unit that controls charge and discharge of each of the plurality of storage batteries on the basis of the information on the type and/or the deterioration level of each of the plurality of storage batteries.

The acquisition unit may communicate with a predetermined storage battery included in the plurality of storage batteries to acquire the information on the type and/or the deterioration level of the predetermined storage battery.

The acquisition unit may measure a charge and discharge characteristic of a predetermined storage battery included in the plurality of storage batteries to acquire the information on the type and/or the deterioration level of the predetermined storage battery.

The acquisition unit may compare the charge and discharge characteristic of the predetermined storage battery with a charge and discharge pattern for each of the types and/or the deterioration levels to acquire the information on the type and/or the deterioration level of the predetermined storage battery.

When a plurality of power sources are available, the charge and discharge control unit may control each of the plurality of storage batteries in association with each of the plurality of power sources on the basis of the information on the type and/or the deterioration level of each of the plurality of storage batteries.

When the plurality of power sources include a distributed power source and the plurality of storage batteries include a storage battery of type suitable for an auxiliary charge, the charge and discharge control unit may control the storage battery of type suitable for an auxiliary charge in association with the distributed power source.

When the plurality of power sources include a grid power source and the plurality of storage batteries include a storage battery of type not suitable for an auxiliary charge, the charge and discharge control unit may control the storage battery of type not suitable for an auxiliary charge in association with the grid power source.

The charge and discharge control unit may determine the association between each of the plurality of storage batteries and each of the plurality of power sources depending on time zone.

The charge and discharge control unit may set a priority of charge and discharge of each of the plurality of storage batteries on the basis of the information on the deterioration level of each of the plurality of storage batteries.

When the plurality of storage batteries include a storage battery of type suitable for an auxiliary charge and a storage battery of type not suitable for an auxiliary charge, the charge and discharge control unit may preferentially discharge the storage battery of type not suitable for an auxiliary charge over discharging the storage battery of type suitable for an auxiliary charge, when the discharge of the storage battery of type not suitable for an auxiliary charge is performed.

A control system of the present invention is a control system that controls a plurality of storage batteries provided in a power consumer, comprising: an acquisition unit that acquires information on type and/or deterioration level of each of the plurality of storage batteries; and a charge and discharge control unit that controls charge and discharge of each of the plurality of storage batteries on the basis of the information on the type and/or the deterioration level of each of the plurality of storage batteries.

A power control method of the present invention is a storage battery control method applied to a control system that controls a plurality of storage batteries provided in a power consumer, comprising: a step A of acquiring information on type and/or deterioration level of each of the plurality of storage batteries; and a step B of controlling charge and discharge of each of the plurality of storage batteries on the basis of the information on the type and/or the deterioration level of each of the plurality of storage batteries.

According to the present invention, it is possible to provide a control apparatus capable of effectively controlling a plurality of storage batteries provided in a consumer, a control system therefore, and a storage battery control method thereof.

DESCRIPTION OF EMBODIMENTS

With reference to the drawings, an embodiment of the present invention will be described in order of: (1) Entire configuration, (2) Configuration of HEMS, (3) Operation of HEMS, (4) Conclusion, and (5) Other embodiments. Note that in the following drawing according to the embodiment, identical or similar symbols are assigned to identical or similar portions.

(1) Entire Configuration

Figure 1:
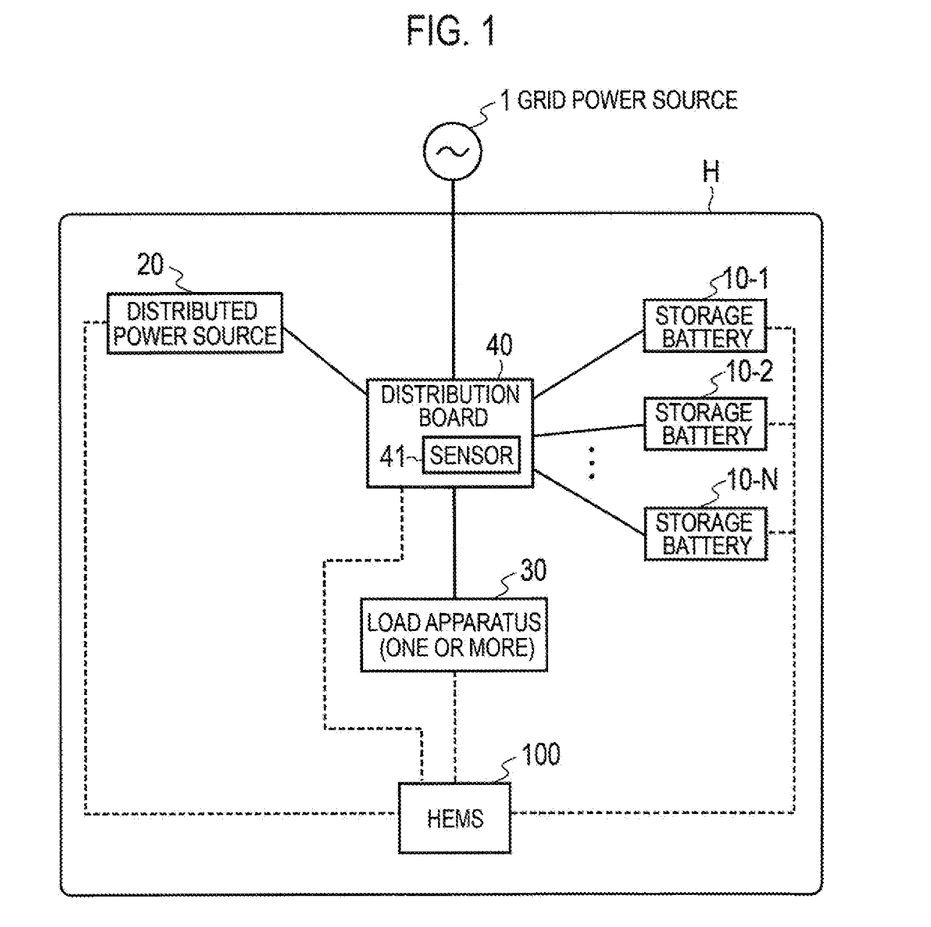
FIG. 1 is a block diagram of a control system according to an embodiment.

FIG. 1 is a block diagram of a control system according to the present embodiment. In FIG. 1, a solid line between blocks indicates a power line and a dashed line between blocks indicates a control line. It is noted that the control line may be connected wirelessly.

As shown in FIG. 1, the control system according to the present embodiment includes a grid power source 1, a plurality of storage batteries 10, a distributed power source 20, one or more load apparatuses 30, a distribution board 40, and an HEMS 100. The plurality of storage batteries 10 configure a group of storage batteries.

The storage batteries 10, the distributed power source 20, the load apparatuses 30, the distribution board 40, and the HEMS 100 are arranged in a home H as a consumer to which the power is supplied from the grid power source 1.

The grid power source 1 is an example of a power source. The grid power source 1 is managed by a power company, and supplies the home H with power. The grid power source 1 is capable of constantly supplying the home H with a stable power unless a power failure occurs.

Generally, during a nighttime where a power demand is smaller, a rate of the power supplied from the grid power source 1 to the home H is set more reasonably as compared to during other time zones.

The storage batteries 10 are charged with power input via the distribution board 40. When the storage batteries 10 are discharged, the power is supplied via the distribution board 40 to the load apparatuses 30. Each of the storage batteries 10 is charged and discharged by control of the HEMS 100.

In the present embodiment, the storage batteries 10 are not unique in type, and various types of storage batteries 10 are combined. For example, a storage battery 10-1 is a storage battery of type suitable for an auxiliary charge, and a storage battery 10-2 is a storage battery of type not suitable for an auxiliary charge.

The "storage battery of type suitable for an auxiliary charge" is a storage battery in which a performance may not easily deteriorate due to a memory effect, for example, even when the storage battery is charged before the accumulated power are completely discharged (so-called additional charging). Examples of the storage battery include a lithium ion battery.

On the other hand, the "storage battery of type not suitable for an auxiliary charge" is a storage battery in which a performance is easily deteriorated due to a memory effect, for example, when the additional charging is performed. Examples of such a storage battery include a nickel-cadmium battery, a nickel-metal hydride battery, and a lead storage battery.

The storage batteries 10 may include a function of managing information on the storage batteries 10 (for example, a type, the number of days used, a capacity, the number of charging times, and the number of discharging times).

The distributed power source 20 is an example of a power source. In this case, the distributed power source 20 means a power generation apparatus that generates power to supply the power via the distribution board 40 to the load apparatuses 30 and/or the storage batteries 10. The distributed power source 20 may be a distributed power source of type capable of controlling an amount of power to be generated and may be a distributed power source of type not capable of controlling the amount of power to be generated.

The "distributed power source of type capable of controlling an amount of power to be generated" is a distributed power source that generates power by using gas, etc., and includes, for example, a fuel cell such as SOFC (Solid Oxide Fuel Cell) or PEFC (Polymer Electrolyte Fuel Cell), etc., and a gas turbine generator. Such a distributed power source is subject to load following control in which the amount of power to be generated is increased or decreased in accordance with an increase or a decrease of the power consumed by the load apparatuses 30. However, such a distributed power source is not capable of rapidly varying the amount of power to be generated, and excess or insufficiency of the power consumed by the load apparatuses 30 may occur.

On the other hand, the "distributed power source of type not capable of controlling the amount of power to be generated" is a distributed power source that uses natural energy (renewable energy) to generate power, and includes a solar cell and a wind power generator, for example. Such a distributed power source is capable of reversely flowing the power generated (i.e., selling the power) to the grid power source 1. However, such a distributed power source is not subject to the load following control.

The load apparatuses 30 operate by consuming the power input via the distribution board 40. Examples of the load apparatuses 30 include a home appliance (for example, a refrigerator, an air conditioner, and an illumination) arranged in the home H.

The distribution board 40 supplies the load apparatuses 30 and the storage batteries 10 with the power supplied from the grid power source 1. Further, the distribution board 40 supplies the load apparatuses 30 with the power supplied from the storage batteries 10, and supplies the load apparatuses 30 and the storage batteries 10 with the power supplied from the distributed power source 20. Moreover, when the distributed power source 20 is a distributed power source that generates power by using natural energy (renewable energy), the distribution board 40 may reversely flow the power generated by the distributed power source 20 to the grid power source 1.

The distribution board 40 changes an internal wire connection state in response to the control by the HEMS 100. For example, the distribution board 40 is capable of electrically connecting/disconnecting any storage battery 10 with the distributed power source 20, and is electrically connecting/disconnecting any storage battery 10 with the grid power source 1.

In the present embodiment, the distribution board 40 includes a sensor 41 that measures various types of power values. The distribution board 40 notifies the HEMS 100 of information on the power detected by the sensor 41. The sensor 41 detects an amount of power to be purchased from the grid power source 1, an amount of power to be sold to the grid power source 1, an amount of power to be generated by the distributed power source 20, and amount of power to be charged to and discharged from the storage batteries 10.

The HEMS 100 communicates with each of the storage batteries 10, the distributed power source 20, the load apparatuses 30, and the distribution board 40, and controls each of the storage batteries 10, the distributed power source 20, the load apparatuses 30, and the distribution board 40. The HEMS 100 will be described in detail, below.

(2) Configuration of HEMS

Figure 2:
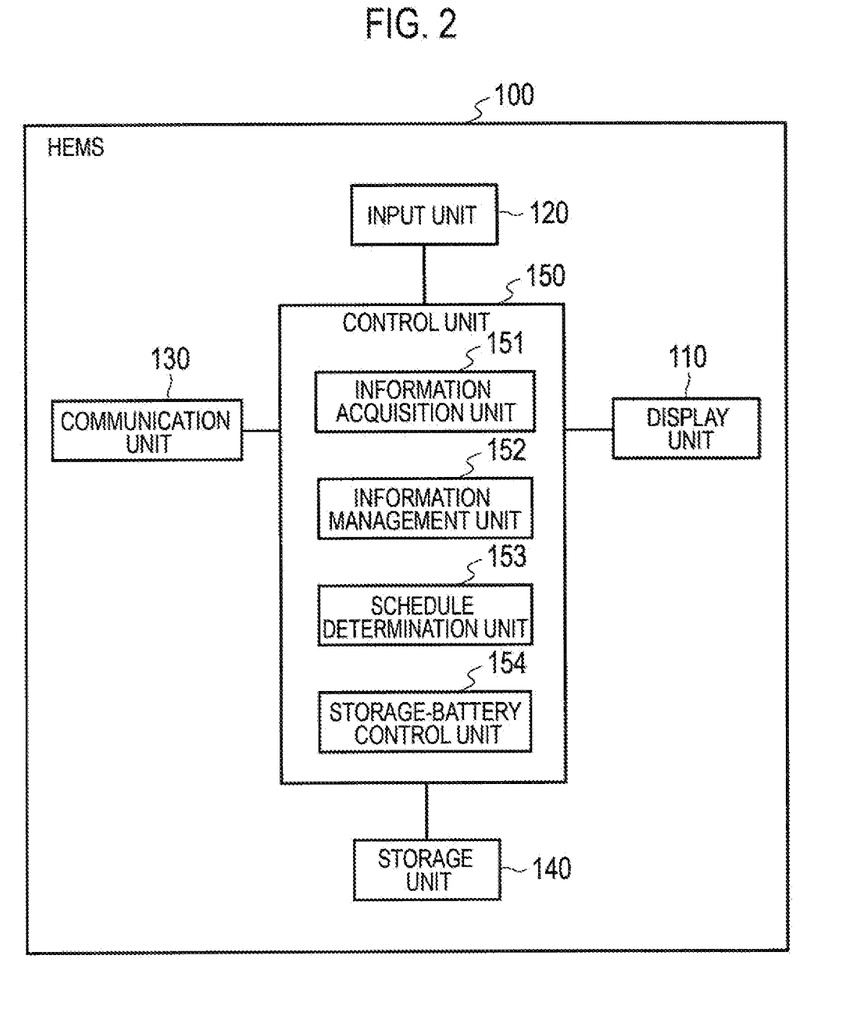
FIG. 2 is a block diagram of an HEMS according to an embodiment.

FIG. 2 is a block diagram of the HEMS 100.

As shown in FIG. 2, the HEMS 100 includes a display unit 110, an input unit 120, a communication unit 130, a storage unit 140, and a control unit 150.

The display unit 250 displays various types of images under the control of the control unit 150. The input unit 120 receives input from a user, and outputs the input content to the control unit 150. The display unit 110 and the input unit 120 may be integrated as a touch panel.

The communication unit 130 communicates with each apparatus (the storage batteries 10, the distributed power source 20, the load apparatuses 30, and the distribution board 40) arranged in the home H, under the control of the control unit 150. The communication unit 130 may be a Zigbee (registered trademark) module for performing radio communication with each apparatus arranged in the home H.

The storage unit 140 stores various types of information used for the control by the control unit 150. Further, the storage unit 140 stores information on the storage batteries 10 (hereinafter referred to as "storage battery information"). The storage battery information includes information on types (for example, lithium ion or lead) of the storage batteries 10. Further, the storage battery information may include information on a level of deterioration (for example, the number of days used, the number of charging times, and the number of discharging times) of the storage batteries 10. Further, the storage battery information may include information on a capacity of the storage batteries 10.

Figure 3:
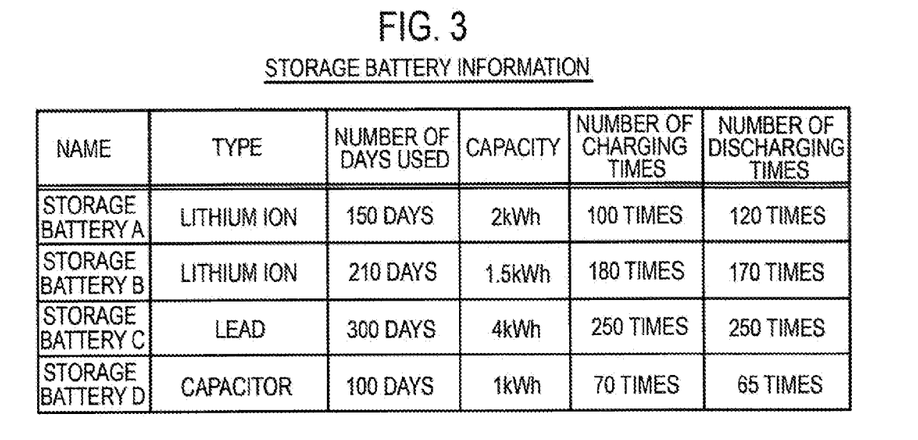
FIG. 3 shows one example of storage battery information according to an embodiment.

FIG. 3 shows one example of the storage battery information stored in the storage unit 140. As shown in FIG. 3, as the storage battery information on the storage battery A, the types: "lithium ion"; the number of days used: "150 days"; the capacity: "2 kWh"; the number of charging times: 100 times; and the number of discharging times: "120 times" are stored. Likewise, these pieces of information are stored for the other storage batteries.

The control unit 150 includes an information acquisition unit 151, an information management unit 152, a schedule determination unit 153, and a storage battery control unit 154.

The information acquisition unit 151 uses the communication unit 130 to acquire the storage battery information on the storage batteries 10. In the present embodiment, when the storage battery 10 is newly arranged in the home H, the information acquisition unit 151 acquires the storage battery information on the newly arranged storage battery 10, and stores the acquired storage battery information in the storage unit 140.

The information acquisition unit 151 uses the communication unit 130 to communicate with the newly arranged storage battery 10 so that the storage battery information on the newly arranged storage battery 10 is acquired. In this case, when the storage battery 10 is newly arranged in the home H and is connected with the HEMS 100, the storage battery 10 may transmit the storage battery information on the storage battery 10 to the information acquisition unit 151 by using a format that complies with a communication protocol such as an Echonet Lite. The information acquisition unit 151 may request the storage battery 10 to transmit further necessary storage battery information after the storage battery information is received from the storage battery 10. In this case, it is presumed that the newly arranged storage battery 10 manages the storage battery information on the newly arranged storage battery 10 itself.

When the newly arranged storage battery 10 does not manage the storage battery information on the newly arranged storage battery 10 itself, the information acquisition unit 151 uses the communication unit 130 to measure the charge and discharge characteristic of the newly arranged storage battery 10 so that the storage battery information on the newly arranged storage battery 10 is acquired. For example, the information acquisition unit 151 uses the communication unit 130 to instruct the newly arranged storage battery 10 to charge and discharge and cyclically acquire the charge and discharge power detected by the sensor 41 so that the charge and discharge characteristic of the newly arranged storage battery 10 is measured. Further, the storage unit 140 previously stores therein a charge and discharge characteristic pattern for each type of storage batteries, and when the information acquisition unit 151 compares the charge and discharge characteristic measured on the storage battery 10 with each charge and discharge characteristic pattern to estimate the type of the storage battery 10. Further, when each charge and discharge characteristic pattern is classified for each deterioration level, it is possible to also estimate the deterioration level of the storage battery 10.

The information management unit 152 manages the storage battery information (see FIG. 3) for each storage battery 10 stored in the storage unit 140. For example, the information management unit 152 updates the number of days used as the days pass, updates the number of charging times as the charge is implemented, and updates the number of discharging times as the discharge is implemented, for each storage battery 10.

The schedule determination unit 153 determines a charge and discharge schedule of each storage battery 10 (hereinafter, briefly referred to as "schedule" where appropriate) for each predetermined period (for example, one day), on the basis of the storage battery information managed by the information management unit 152. The charge and discharge schedule means a schedule in which a particular storage battery 10 charges and discharges in a particular mode during a particular time zone. The charge and discharge modes of the storage battery 10 will be described later.

In the present embodiment, the schedule determination unit 153 determines the schedule so that each of the plurality of storage batteries 10 is associated with each of the plurality of power sources (the grid power source 1 and the distributed power source 20) on the basis of the storage battery information of each storage battery 10.

Firstly, the schedule determination unit 153 determines the schedule so that the storage battery 10 of type suitable for an auxiliary charge is associated with the distributed power source 20. As described above, the distributed power source 20 may often generate excess or insufficiency of the power to be generated. Therefore, the schedule determination unit 153 determines the schedule so that the storage battery 10 of type suitable for an auxiliary charge is associated with the distributed power source 20 to compensate the excess or insufficiency. As a result, it is possible to reduce the amount of power to be purchased from the grid power source 1 and increase the amount of power to be sold to the grid power source 1.

Secondly, the schedule determination unit 153 determines the schedule so that the storage battery 10 of type not suitable for an auxiliary charge is associated with the grid power source 1. As described above, basically, the grid power source 1 is capable of constantly supplying the stable power. Therefore, the schedule determination unit 153 associates the storage battery 10 of type not suitable for an auxiliary charge with the grid power source 1 to fully charge the storage battery 10, and in this state, the schedule determination unit 153 determines the schedule so that all the power are discharged from the storage battery 10. As a result, for example, the storage battery 10 is fully charged by the low-cost nighttime grid power, and during other time zones, it is possible to discharge all the power from the storage battery 10.

Thirdly, the schedule determination unit 153 sets the priority of charge and discharge for each storage battery 10 on the basis of the deterioration level (for example, the number of days used, the number of charging times, and the number of discharging times) of each storage battery 10. For example, when there are a plurality of storage batteries 10 of the same type, the priority for the storage battery 10 having a low deterioration level is "high" (main) and the priority for the storage battery 10 having a high deterioration level is "low" (backup). As a result, it becomes possible to level the deterioration levels of the storage batteries 10, and it is thus possible to increase the longevity of a group of the storage batteries. Alternatively, the priority for the storage battery 10 having a low deterioration level is "low" (backup) and the priority for the storage battery 10 having a high deterioration level is "high" (main). As a result, the storage battery 10 the deterioration of which has progressed may run out quickly and be replaced with new one to improve a performance of the group of the storage batteries.

The storage battery control unit 154 controls each storage battery 10 in accordance with the schedule determined by the schedule determination unit 153. In particular, the storage battery control unit 154 uses the communication unit 130 to transmit, to each storage battery 10, an instruction for charge and discharge, and transmits, to the distribution board 40, an instruction to change a wire connection state. A signal that complies with a communication protocol such as Lite and ZigBee is used to transmit various types of instructions.

The storage battery control unit 154 may change the schedule where appropriate when it becomes necessary to change the schedule in accordance with an amount of power to be accumulated in the storage batteries 10 and an amount of power to be consumed in the load apparatuses 30.

The storage battery control unit 154 may control the display unit 110 so that information on the charge and discharge schedule (see FIG. 4) is displayed. Further, the schedule may be changed in response to a user input to the input unit 120.

(3) Operation of HEMS

An operation of the HEMS 100 will be described below.

(3.1) Storage Battery Information Acquisition Operation

Figure 4:
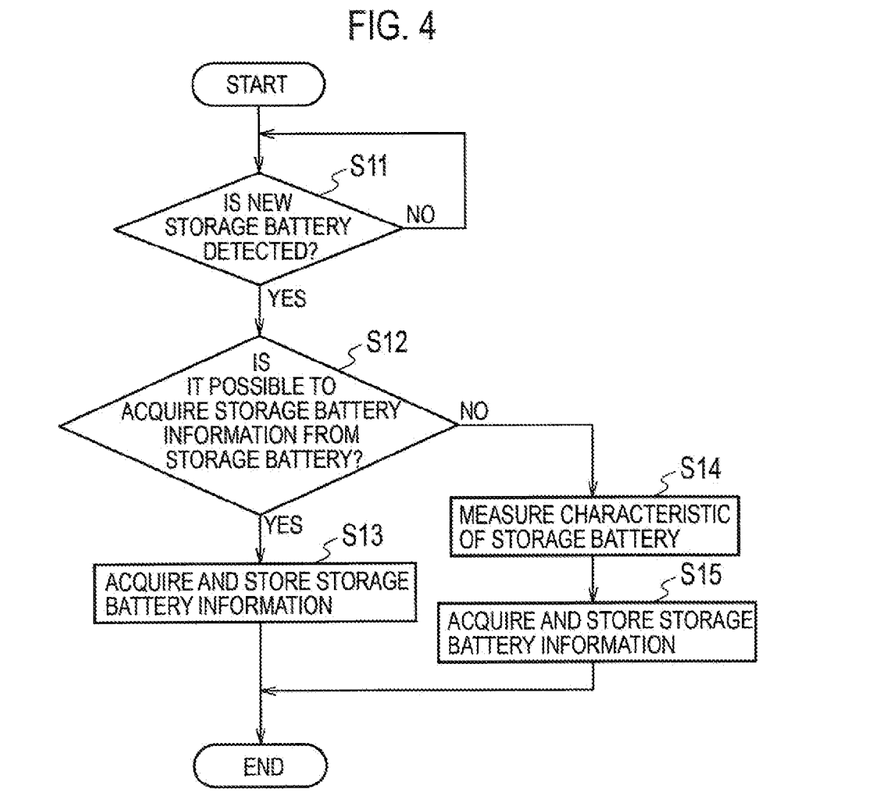
FIG. 4 is an operation flowchart of a storage battery information acquisition operation in the HEMS according to an embodiment.

FIG. 4 is an operation flowchart of a storage battery information acquisition operation in the HEMS 100.

As shown in FIG. 4, in step S11, the information acquisition unit 151 confirms whether or not the storage battery 10 newly arranged in the home H has been detected. When the newly arranged storage battery 10 has been detected (step S11; Yes), the process proceeds to step S12.

In step S12, the information acquisition unit 151 confirms whether or not it is possible to acquire the storage battery information from the newly arranged storage battery 10, that is, confirms whether or not the storage battery 10 manages the storage battery information on the storage battery 10 itself. When it is possible to acquire the storage battery information from the newly arranged storage battery 10 (step S12; YES), the process proceeds to step S13. On the other hand, when it is not possible to acquire the storage battery information from the newly arranged storage battery 10 (step S12; YES), the process proceeds to step S14.

In step S13, the information acquisition unit 151 acquires the storage battery information from the newly arranged storage battery 10 and stores the acquired storage battery information in the storage unit 140.

On the other hand, in step S14, the information acquisition unit 151 measures the charge and discharge characteristic of the newly arranged storage battery 10.

In step S15, the information acquisition unit 151 acquires the storage battery information on the newly arranged storage battery 10 on the basis of the charge and discharge characteristic measured in step S14, and stores the acquired storage battery information in the storage unit 140.

(3.2) Charge and Discharge Control Operation

Figure 5:
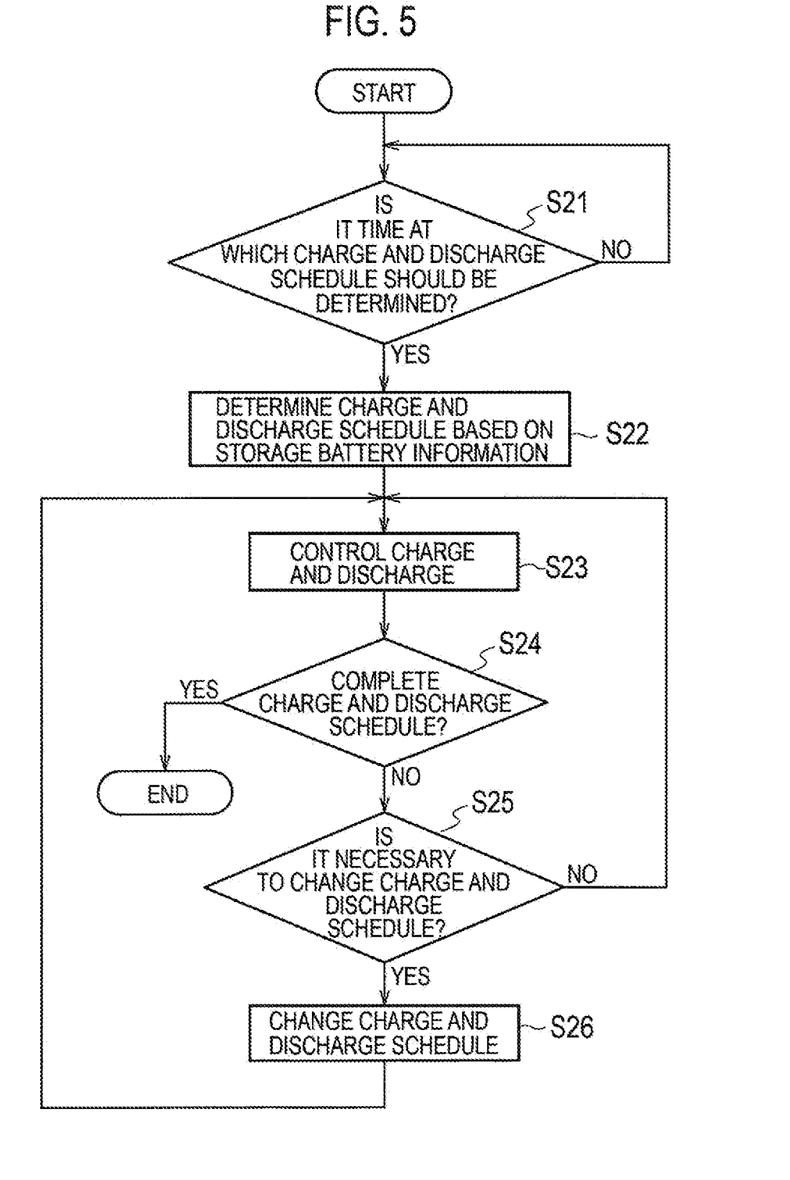
FIG. 5 is an operation flowchart of a charge and discharge control operation in the HEMS according to an embodiment.

FIG. 5 is an operation flowchart of a charge and discharge control operation in the HEMS. The present operation flow assumes a case where the schedule is determined in each day, for example.

As shown in FIG. 5, in step S21, the schedule determination unit 153 confirms whether or not a present time is a time for determining the schedule. When the present time is the time at which the schedule should be determined (step S21; YES), the process proceeds to step S22.

In step S22, the schedule determination unit 153 determines the schedule for each storage battery 10 depending on each time zone in a day, on the basis of the storage battery information for each storage battery 10 stored in the storage unit 140. A specific example of the schedule will be described later.

In step S23, the storage battery control unit 154 controls each storage battery 10 in accordance with the schedule on that day.

In step S24, the storage battery control unit 154 confirms whether or not the schedule on that day is completed. When the schedule on the day is not completed (step S24; NO), the process proceeds to step S25.

In step S25, the storage battery control unit 154 confirms whether or not it is necessary to change the schedule on that day. When it is not necessary to change the schedule on the day (step S25; NO), the process returns to step S23. On the other hand, when it is necessary to change the schedule on the day (step S25; Yes), the process proceeds to step S26.

In step S26, the storage battery control unit 154 changes the schedule on that day. Then, the process returns to step S23.

Figure 6:
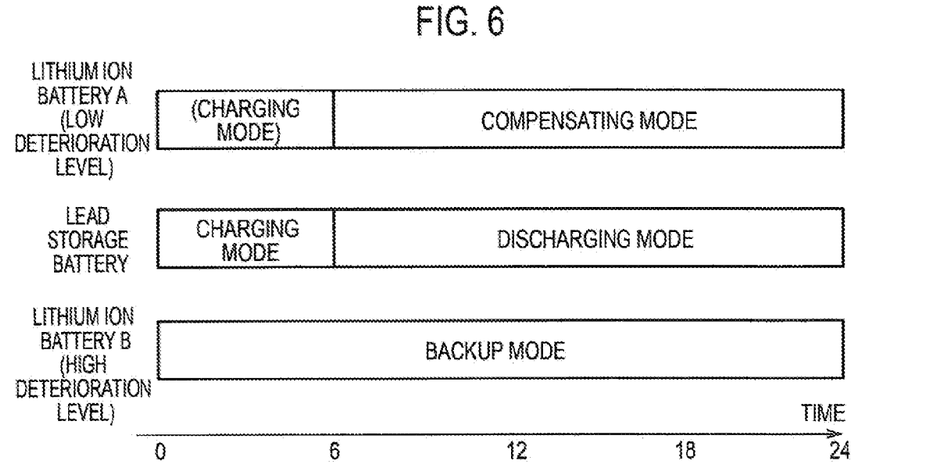
FIG. 6 is a diagram for describing a specific example of a charge and discharge schedule according to an embodiment.

FIG. 6 is a diagram for describing a specific example of the schedule. In this case, a lithium ion battery is taken as an example of the storage battery 10 of type suitable for an auxiliary charge, and a lead storage battery is taken as an example of the storage battery 10 of type not suitable for an auxiliary charge. Further, a case is assumed where a lithium ion battery A having a low deterioration level and a lithium ion battery B having a high deterioration level are combined to be used.

As shown in FIG. 6, the schedule determination unit 153 determines the schedule so that the lithium ion battery A is associated with the distributed power source 20.

In particular, the schedule determination unit 153 determines to operate the lithium ion battery A in a mode (compensating mode) in which the excess or insufficiency of the amount of power to be generated in the distributed power source 20 is compensated during a period other than a time zone (nighttime zone) when the amount of power to be consumed in the load apparatuses 30 is small.

In the compensating mode, the storage battery control unit 154 controls to discharge the power equivalent to the insufficient amount from the lithium ion battery A when the amount of power to be generated in the distributed power source 20 is insufficient for the amount of power to be consumed in the load apparatuses 30. Further, in the compensating mode, the storage battery control unit 154 controls to charge the power equivalent to the excessive amount to the lithium ion battery A when the amount of power to be generated in the distributed power source 20 is excessive for the amount of power to be consumed in the load apparatuses 30. In this case, the storage battery control unit 154 grasps a difference between the amount of power to be generated in the distributed power source 20 and the amount of power to be consumed in the load apparatuses 30 from the measured value of the sensor 41, for example, and controls the charge and discharge of the lithium ion battery A.

On the other hand, the schedule determination unit 153 determines to operate the lithium ion battery A in a mode (charging mode) in which the lithium ion battery A is charged with the grid power during a time zone (nighttime zone) when the amount of power to be consumed in the load apparatuses 30 is small.

In the charging mode, the storage battery control unit 154 controls to charge the lithium ion battery A with a low-cost nighttime grid power. However, when the lithium ion battery A is in a fully charged state at the time point at which the compensating mode is ended, the charging mode may be canceled.

Further, the schedule determination unit 153 determines the schedule so that the lead storage battery is associated with the grid power source 1.

In particular, in a time zone (nighttime zone) when the amount of power to be consumed in the load apparatuses 30 is small, the schedule determination unit 153 determines an operation in a mode (charging mode) in which the lead storage battery is charged by the grid power to a fully charged state, and in other time zones, determines an operation in a mode (discharging mode) in which all the power is discharged from the lead storage battery.

In the charging mode, the storage battery control unit 154 controls to charge the lead storage battery with a low-cost nighttime grid power. On the other hand, in the discharging mode, the storage battery control unit 154 controls to discharge, from the lead storage battery, the power equivalent to the insufficient amount when the amount of power to be generated in the distributed power source 20 is insufficient for the amount of power to be consumed in the load apparatuses 30. In a case where both the lithium ion battery A and the lead storage battery are capable of being discharged, it is preferable to preferentially discharge the lead storage battery first in order to reduce the amount of power to be accumulated in the lead storage battery to zero.

Further, the schedule determination unit 153 determines the schedule so that the lithium ion battery B is associated with the distributed power source 20. In this case, the deterioration level of the lithium ion battery B is high, and thus, the schedule determination unit 153 uses a mode (backup mode) in which the priority for the lithium ion battery B is set to "low" (backup).

In the backup mode, the storage battery control unit 154 controls to use the lithium ion battery B as a backup for the lithium ion battery A. For example, the storage battery control unit 154 controls to charge the lithium ion battery B instead of the lithium ion battery A after the lithium ion battery A reaches the fully charged state. Further, when the amount of power to be accumulated in the lithium ion battery A falls below a predetermined lower limit value, or when the lithium ion battery A experiences an abnormality, the storage battery control unit 154 may change to operate the lithium ion battery B, instead of the lithium ion battery A, in the compensating mode.

(4) Conclusion

As described above, the HEMS 100 that controls the plurality of storage batteries 10 arranged in the home controls charge and discharge for each of the plurality of storage batteries 10 on the basis of the storage battery information for each of the plurality of storage batteries 10. This enables efficient control of the plurality of storage batteries 10.

In the present embodiment, the HEMS 100 communicates with the newly arranged storage battery 10 so that the storage battery information on the newly arranged storage battery 10 is acquired. Alternatively, the HEMS 100 measures the charge and discharge characteristic of the newly arranged storage battery 10 so that the storage battery information on the newly arranged storage battery 10 is acquired. This enables the HEMS 100 to automatically acquire the storage battery information.

In the present embodiment, the HEMS 100 controls the storage battery 10 of type suitable for an auxiliary charge in association with the distributed power source 20. As a result, it is possible to compensate the excess or insufficiency of the power to be generated in the distributed power source 20. As a result, it is possible to reduce the amount of power to be purchased from the grid power source 1 and increase the amount of power to be sold to the grid power source 1.

In the present embodiment, the HEMS 100 controls the storage battery 10 of type not suitable for an auxiliary charge in association with the grid power source 1. As a result, the storage battery 10 can be made fully charged with the low-cost nighttime grid power, and during other time zones, it is possible to discharge all the power from the storage battery 10. As a result, it is possible to reduce an electric charge in the home H.

In the present embodiment, the HEMS 100 determines the association between each of the plurality of storage batteries 10 and each of the plurality of power sources, depending on each time zone. As a result, it is possible to efficiently control the plurality of storage batteries 10 in consideration of the electric charge and the amount of power to be consumed.

In the present embodiment, the HEMS 100 sets the priority for charge and discharge for each of the plurality of storage batteries 10 on the basis of the information on the deterioration level of each of the plurality of storage batteries 10. As a result, it is possible to level the deterioration level of the group of storage batteries and to improve the performance of the group of storage batteries.

(5) Other Embodiments

As described above, the present invention has been described with the embodiments. However, it should not be understood that those descriptions and drawings constituting a part of the present disclosure limit the present invention. From this disclosure, a variety of alternate embodiments, examples, and applicable techniques will become apparent to one skilled in the art.

For example, a storage battery mounted in an electric vehicle can be regarded as one storage battery configuring a group of storage batteries when the electric vehicle is not used.

Further, in the above-described embodiment, in the charging mode, the storage battery control unit 154 controls to charge the storage battery 10 with a low-cost nighttime grid power. However, in the charging mode, the storage battery control unit 154 may control to charge the storage battery 10 with the power generated by the distributed power source 20.

Further, in the above-described embodiment, the HEMS 100 is described which is a control apparatus for managing power for each home, and the HEMS 100 may be BEMS (Building and Energy Management System) that manages a building, may be FEMS (Factory Energy Management System) that manages a factory, and may be CEMS (Community Energy Management System) that manages a region, for example.

As described above, needless to say, the present invention includes various embodiments and the like not described here. Moreover, it is also possible to combine the above-described embodiments and modifications. Therefore, the technical range of the present invention is to be defined only by the inventive specific matter according to the adequate claims from the above description.

It is noted that the entire content of Japanese Patent Application No. 2012-040684 (filed on Feb. 27, 2012) is incorporated in the present specification by reference.

INDUSTRIAL APPLICABILITY

According to the present invention, it is possible to provide a control apparatus capable of effectively controlling a plurality of storage batteries provided in a consumer, a control system therefore, and a storage battery control method thereof.

The invention claimed is:
1. A control apparatus configured to control a plurality of storage batteries provided in a power consumer, comprising:
an acquisition unit configured to acquire information on type, indicative of whether or not each of the plurality of storage batteries is suitable for an auxiliary charge, from each of the plurality of storage batteries; and
a charge and discharge control unit configured to control charge and discharge of each of the plurality of storage batteries on the basis of the information on the type of each of the plurality of storage batteries,
wherein the charge and discharge control unit is configured to associate a first storage battery that is suitable for an auxiliary charge with a distributed power source and schedule a compensating mode as an operation mode applied to the first storage battery, when the plurality of storage batteries include the first storage battery and a plurality of power source include the distributed power source, a performance of the first storage battery being not easily deteriorated due to a memory effect,
wherein the charge and discharge control unit is configured to, in the compensating mode, control so as to charge the first storage battery by power provided from the distributed power source when power generated by the distributed power source exceeds a consumption power amount of a load apparatus, and control so as to discharge the first storage battery when the power generated by the distributed power source is insufficient to the consumption power amount of the load apparatus,
wherein the charge and discharge control unit is configured to associate a second storage battery that is not suitable for the auxiliary charge with a grid power source and schedule a discharging mode as an operation mode applied to the second storage battery, when the plurality of storage batteries include the second storage battery and the plurality of power source include the grid power source, a performance of the second storage battery being easily deteriorated due to a memory effect, and
wherein the charge and discharge control unit is configured to, in the discharging mode, control so as not to charge the second storage battery by the power provided from the distributed power source even when the power generated by the distributed power source exceeds the consumption power amount of the load apparatus, and control so as to discharge the second storage battery when the power generated by the distributed power source is insufficient to the consumption power amount of the load apparatus.

2. The control apparatus according to claim 1, wherein the acquisition unit is configured to communicate with a predetermined storage battery included in the plurality of storage batteries to acquire storage battery information at least including the information on the deterioration level of the predetermined storage battery.

3. The control apparatus according to claim 2, wherein the acquisition unit is configured to acquire the storage battery information from the predetermined storage battery when the predetermined storage battery is newly connected to the control apparatus.

4. The control apparatus according to claim 2, wherein the acquisition unit is configured to request information on the predetermined storage battery other than information included in the storage battery information in response to a reception of the storage battery information.

5. The control apparatus according to claim 2, wherein the acquisition unit is configured to acquire the storage battery information by a format compliant with ECHONET Lite.

6. The control apparatus according to claim 1, wherein the acquisition unit is configured to measure a charge and discharge characteristic of a predetermined storage battery included in the plurality of storage batteries to acquire the information on the type and/or the deterioration level of the predetermined storage battery.

7. The control apparatus according to claim 6, wherein the acquisition unit is configured to compare the charge and discharge characteristic of the predetermined storage battery with a charge and discharge pattern for each of the types and/or the deterioration levels to acquire the information on the type and/or the deterioration level of the predetermined storage battery.

8. The control apparatus according to claim 7, wherein the charge and discharge control unit is configured to determine the association between each of the plurality of storage batteries and each of the plurality of power sources depending on each time zone.

9. The control apparatus according to claim 1, wherein the charge and discharge control unit is configured to set a priority of charge and discharge for each of the plurality of storage batteries on the basis of the information on the deterioration level of each of the plurality of storage batteries.

10. The control apparatus according to claim 1, wherein the charge and discharge control unit is configured to more preferentially discharge the second storage battery than the first storage battery when the plurality of storage batteries include the first storage battery and the second storage battery and the compensating mode and the discharging mode are determined to be scheduled on the same time zone.

11. A control system that controls a plurality of storage batteries provided in a power consumer, comprising a control apparatus according to claim 1.

12. A storage battery control method applied to a control system that controls a plurality of storage batteries provided in a power consumer, comprising steps of:
  acquiring information on type, indicative of whether or not each of the plurality of storage batteries is suitable for an auxiliary charge, from each of the plurality of storage batteries;
  controlling charge and discharge of each of the plurality of storage batteries on the basis of the information on the type of each of the plurality of storage batteries;
  associating a first storage battery that is suitable for an auxiliary charge with a distributed power source and scheduling a compensating mode as an operation mode applied to the first storage battery, when the plurality of storage batteries include the first storage battery and a plurality of power source includes the distributed power source, a performance of the first storage battery being not easily deteriorated due to a memory effect;
  in the compensating mode, controlling so as to charge the first storage battery by power provided from the distributed power source when power generated by the distributed power source exceeds a consumption power amount of a load apparatus, and controlling so as to discharge the first storage battery when the power generated by the distributed power source is insufficient to the consumption power amount of the load apparatus;
  associating a second storage battery that is not suitable for the auxiliary charge with a grid power source and scheduling a discharging mode as an operation mode applied to the second storage battery, when the plurality of storage batteries include the second storage battery and the plurality of power source includes the grid power source, a performance of the second storage battery being easily deteriorated due to a memory effect; and,
  in the discharging mode, controlling so as not to charge the second storage battery by the power provided from the distributed power source even when the power generated by the distributed power source exceeds the consumption power amount of the load apparatus, and controlling so as to discharge the second storage battery when the power generated by the distributed power source is insufficient to the consumption power amount of the load apparatus.

* * * * *